US012544469B2

(12) United States Patent
Feenstra et al.

(10) Patent No.: US 12,544,469 B2
(45) Date of Patent: Feb. 10, 2026

(54) LOW-COST, PORTABLE, FLAMELESS-HEATER-POWERED THERMO-CHEMICAL DECONTAMINATION SYSTEM FOR FACEMASKS AND OTHER TYPES OF PERSONAL PROTECTION EQUIPMENT (PPE)

(71) Applicant: Raytheon Company, Waltham, MA (US)

(72) Inventors: Travis B. Feenstra, Calimesa, CA (US); David D. Crouch, Riverside, CA (US); Alf L. Carroll, III, Marion, MA (US); John Carcone, Portsmouth, RI (US); David R. Sar, Marana, AZ (US)

(73) Assignee: Raytheon Company, Arlington, VA (US)

( * ) Notice: Subject to any disclaimer, the term of this patent is extended or adjusted under 35 U.S.C. 154(b) by 809 days.

(21) Appl. No.: 17/182,067

(22) Filed: Feb. 22, 2021

(65) Prior Publication Data
US 2022/0265880 A1 Aug. 25, 2022

(51) Int. Cl.
*A61L 2/20* (2006.01)
*A61L 2/26* (2006.01)
*F24V 30/00* (2018.01)

(52) U.S. Cl.
CPC .............. *A61L 2/208* (2013.01); *A61L 2/26* (2013.01); *F24V 30/00* (2018.05);
(Continued)

(58) Field of Classification Search
CPC ........ A61L 2202/122; A61L 9/02; A61L 9/04; A61L 2/0023; A61L 2/07; B65D 81/3484
See application file for complete search history.

(56) References Cited

U.S. PATENT DOCUMENTS 4,861,956 A 8/1989 Courneya
5,108,701 A 4/1992 Zakaria et al.
(Continued)

FOREIGN PATENT DOCUMENTS

CN 109959175 A 7/2019
EP 0507461 A2 10/1992
(Continued)

OTHER PUBLICATIONS

Fashions ZOOM, "Ladies Longline Silhouette Velcro Sleeve Concealed Zipper Hooded Raincoat 4-12", Jun. 7, 2018, Ebay. Accessed at https://www.ebay.com/itm/142824877718?chn=ps&mkevt=1 &mkcid=28&var=441827594190&srsltid= AfmBOor45n0IVZ48t0zbYwAt-4yVIFq7lg2GGGmAzZXbgdK3_ 1abij150dk (Year: 2018).*
(Continued)

*Primary Examiner* — Elizabeth A Robinson
*Assistant Examiner* — Changru Chen (57) ABSTRACT

An apparatus includes a containment vessel having an interior space configured to be sealed. The interior space is configured to receive (i) liquid to be vaporized during a decontamination process and (ii) one or more pieces of personal protection equipment to be heated and decontaminated during the decontamination process. The apparatus also includes one or more flameless heaters configured to generate heat without a flame when activated. The apparatus further includes a thermal pouch configured to enclose the containment vessel and the one or more flameless heaters such that the heat from the one or more flameless heaters heats the containment vessel during the decontamination process.

20 Claims, 6 Drawing Sheets

(52) U.S. Cl.
CPC ...... *A61L 2202/11* (2013.01); *A61L 2202/121* (2013.01); *A61L 2202/122* (2013.01); *A61L 2202/14* (2013.01); *A61L 2202/26* (2013.01)

(56) References Cited

U.S. PATENT DOCUMENTS

| | | | |
|---|---|---|---|
| 5,117,809 A | | 6/1992 | Scaringe et al. |
| 5,465,707 A | | 11/1995 | Fulcher et al. |
| 9,222,665 B2 | | 12/2015 | Halas et al. |
| 9,623,134 B1 | * | 4/2017 | Bala ..................... G01N 31/226 |
| 9,878,061 B2 | | 1/2018 | Shur et al. |
| 10,654,726 B2 | | 5/2020 | Nigrelli |
| 2003/0165398 A1 | * | 9/2003 | Waldo ..................... A61L 2/087 604/20 |
| 2004/0001783 A1 | * | 1/2004 | Bowen ..................... A61L 2/07 422/26 |
| 2009/0123332 A1 | * | 5/2009 | Whitehead .............. B31B 50/74 422/26 |
| 2011/0110820 A1 | * | 5/2011 | Mann ..................... C01B 13/11 422/105 |
| 2011/0188787 A1 | * | 8/2011 | Cho ..................... B65D 31/12 383/104 |
| 2016/0352022 A1 | | 12/2016 | Thomson et al. |
| 2019/0024137 A1 | * | 1/2019 | Bala ..................... G01N 31/226 |

FOREIGN PATENT DOCUMENTS

| | | | | |
|---|---|---|---|---|
| GB | 2019217 A | | 10/1979 | |
| GB | 2541394 A | | 2/2017 | |
| JP | 2009504259 A | * | 2/2009 | ............... A61L 2/24 |
| KR | 200182929 Y1 | * | 5/2000 | ............... A61L 2/24 |
| KR | 20180040464 A | * | 4/2018 | ......... B65D 81/3484 |
| WO | 2005000367 A2 | | 1/2005 | |
| WO | 2017223224 A1 | | 12/2017 | |
| WO | WO-2019084203 A1 | * | 5/2019 | ........... A61L 2/0082 |

OTHER PUBLICATIONS

KR 20180040464 A_translation (Year: 2018).*
R. Oliver, A.H. Tomlinson, "Sterilization of surgical rubber gloves and plastic tubing by means of ionizing radiation", Cambridge, May 15, 2009, p. 465-472, Accessed Sep. 23, 2024, https://www.cambridge.org/core/services/aop-cambridge-core/content/view/25BCA6DFF64D8155E7E8DCB4FB5AEDE5/S00221724000385 (Year: 1960).*
JP_2009504259_A_translation (Year: 2009).*
KR_200182929_Y1_Translation (Year: 2001).*
International Search Report and Written Opinion of the International Searching Authority dated Apr. 21, 2022 in connection with International Patent Application No. PCT/US2022/011644, 11 pages.
Mechler, "Mask Disinfection & Sterilization for Viruses", https://consteril.com/covid-19-pandemic-disinfection-and-sterilization-of-face-masks-for-viruses, Apr. 2020, 19 pages.
U.S. Department of Labor, "Hospital Respiratory Protection Program Toolkit Resources for Respirator Program Administrators", Occupational Safety and Health Administration (OSHA), DHHS (NIOSH) Publication No. 2015-117, OSHA Publication No. 3767, May 2015, 96 pages.
"Food Cooking Medical Sterilization and Ice Making (adsorption process) with the "Soleil-Vapeur" Solar Thermal Steam Unit", www.soleil-vapeur.org, Oct. 2014, 4 pages.
Heimbuch et al., "A Pandemic Influenza Preparedness Study: Use of Energetic Methods to Decontaminate Filtering Facepiece Respirators Contaminated with H1N1 Aerosols and Droplets", Jun. 2012, 11 pages.
"Bioquell | Clarus C", Product Sheet, LS001-MKT-011 Rev 1, Bioquell UK Ltd., 2012, 2 pages.
Lowe et al., "N95 Filtering Facepiece Respirator Ultraviolet Germicidal Irradiation (UVGI) Process for Decontamination and Reuse", Nebraska Medicine, Apr. 2020, 19 pages.
Roel, "350mm f/4 lightweight truss Dobson (airline transportable)", DIY Astronomer—Stargazers Lounge—stargazerslounge.com/topic/201633-350mm-f4-lightweight-truss-dobson-airline-transportable, Dec. 2013, 23 pages.
Sherwin, "GoSun Sport: Portable, High Efficiency Solar Cooker", Kickstarter, https://www.kickstarter.com/projects/patricksherwin/gosun-stove-portable-high-efficiency-solar-cooker, May 2019, 29 pages.
"Parabolic Solar Trough—Thermal Water Heater", Parabolic Trough Concentrated Solar Power, https://www.parabolicsolartrough.com, Feb. 24, 2017, 6 pages.
Lu, "Portable device uses solar power to sterilise medical equipment", New Scientist Ltd., Nov. 2020, 6 pages.
"Preppers Peak Solar Cooker Kettle for Camping Outdoor Travel with Solar Technology", Kettles for Water, http://www.kettlesforwater.com/camping/Preppers-Peak-Solar- . . . , Apr. 2017, 2 pages.
Carlson, et al., "Solar powered water purification system", Santa Clara University Scholar Commons, Mechanical Engineering Senior Theses, Jan. 2012, 160 pages.
"Sterilizing medical tools off the grid using solar heat", https://www.innovationtoronto.com/2020/11/sterilizing-medical-tools-off-the-grid-using-solar-heat, Innovation Toronto, Nov. 2020, 5 pages.
Chandler, "Sterilizing with the sun: Solar concentrating system could replace fuel-powered or electric devices in remote villages", Phys.Org News, Feb. 2013, 3 pages.
Communication pursuant to Article 94(3) EPC dated Nov. 13, 2025 in connection with European Patent Application No. 22701490.9, 5 pages.

* cited by examiner

LOW-COST, PORTABLE, FLAMELESS-HEATER-POWERED THERMO-CHEMICAL DECONTAMINATION SYSTEM FOR FACEMASKS AND OTHER TYPES OF PERSONAL PROTECTION EQUIPMENT (PPE)

TECHNICAL FIELD

This disclosure relates generally to medical decontamination devices and processes. More specifically, this disclosure relates to a low-cost, portable, flameless-heater-powered thermo-chemical decontamination system for facemasks and other types of personal protection equipment (PPE).

BACKGROUND

A dangerous gap has developed in the available supply of disposable facemasks, such as N95/KN95/N99/N100/P100 surgical masks, and other personal protection equipment (PPE), such as surgical gowns, booties, and gloves, as a result of the COVID-19 pandemic. Accelerating demand has outstripped the ability of the supply chain to keep pace. Some countries may struggle to retool or repurpose manufacturing facilities to produce personal protection equipment. Also, some military units may not have access to personal protection equipment or the ability to acquire personal protection equipment during missions, such as in remote or unfriendly parts of the world. In addition, disaster-stricken areas may lose logistical support and have stockpiles of personal protection equipment damaged.

SUMMARY

This disclosure provides a low-cost, portable, flameless-heater-powered thermo-chemical decontamination system for facemasks and other types of personal protection equipment (PPE).

In a first embodiment, an apparatus includes a containment vessel having an interior space configured to be sealed. The interior space is configured to receive (i) liquid to be vaporized during a decontamination process and (ii) one or more pieces of personal protection equipment to be heated and decontaminated during the decontamination process. The apparatus also includes one or more flameless heaters configured to generate heat without a flame when activated. The apparatus further includes a thermal pouch configured to enclose the containment vessel and the one or more flameless heaters such that the heat from the one or more flameless heaters heats the containment vessel during the decontamination process.

In a second embodiment, a method includes placing liquid to be vaporized during a decontamination process in an interior space of a containment vessel. The method also includes placing one or more pieces of personal protection equipment within the interior space of the containment vessel and sealing the interior space of the containment vessel. The method further includes activating one or more flameless heaters to generate heat without a flame. The method also includes enclosing, in a thermal pouch, the containment vessel and the one or more flameless heaters. In addition, the method includes decontaminating the one or more pieces of personal protection equipment by heating the one or more pieces of personal protection equipment in the sealed interior space of the containment vessel using the heat generated by one or more flameless heaters.

Other technical features may be readily apparent to one skilled in the art from the following figures, descriptions, and claims.

BRIEF DESCRIPTION OF THE DRAWINGS

For a more complete understanding of this disclosure, reference is made to the following description, taken in conjunction with the accompanying drawings, in which.

DETAILED DESCRIPTION

FIGS. 1 through 7, described below, and the various embodiments used to describe the principles of the present disclosure are by way of illustration only and should not be construed in any way to limit the scope of the disclosure. Those skilled in the art will understand that the principles of the present disclosure may be implemented in any type of suitably arranged device or system.

As noted above, a dangerous gap has developed in the available supply of disposable facemasks, such as N95/KN95/N99/N100/P100 surgical masks, and other personal protection equipment (PPE), such as surgical gowns, booties, and gloves, as a result of the COVID-19 pandemic. Accelerating demand has outstripped the ability of the supply chain to keep pace. Some countries may struggle to retool or repurpose manufacturing facilities to produce personal protection equipment. Also, some military units may not have access to personal protection equipment or the ability to acquire personal protection equipment during missions, such as in remote or unfriendly parts of the world. In addition, disaster-stricken areas may lose logistical support and have stockpiles of personal protection equipment damaged. Under normal circumstances, facemasks, surgical gowns, booties, gloves, and other personal protection equipment may typically be disposable, meaning they are worn once and discarded. However, when supplies run low (such as during a pandemic or when otherwise unavailable), it may be necessary or desirable to decontaminate and reuse facemasks, surgical gowns, booties, gloves, and other personal protection equipment.

Some approaches for decontaminating personal protection equipment involve the use of hydrogen peroxide ($H_2O_2$) vapor to decontaminate the personal protection equipment. However, these approaches may take an extended period of time (such as about 8 hours) to complete, which can be problematic in environments where a large amount of personal protection equipment is used. These approaches may also require high concentrations of hydrogen peroxide (such as 35% compared to about 3% to 6% over-the-counter solutions), which can be toxic and potentially explosive. Other approaches for decontaminating personal protection equipment involve the use of ultraviolet germicidal irradiation in which the personal protection equipment is illuminated using ultraviolet light, which can deactivate or kill bacteria and viruses. However, inner layers of a facemask or other personal protection equipment may not receive a high enough dose of ultraviolet radiation, and light transmittance varies among equipment. Also, straps or other structures of personal protection equipment can present a residual contamination risk and may require a secondary decontamination process, and it is often challenging to ensure that all surfaces/layers of personal protection equipment are completely decontaminated due to shadowing effects. Still other approaches for decontaminating personal protection equipment involve the use of microwave-generated or solar-generated steam, which is an effective technique for decontaminating medical instruments and other materials used every day in surgeries, procedures, and patient services. However, when used with disposable personal protection equipment, microwave-generated or solar-generated steam runs the risk of overheating the personal protection equipment, causing damage or degradation. If a facemask is even slightly deformed by heating to excessive temperatures, it can lose its ability to protect the wearer and must be discarded.

This disclosure provides various low-cost and portable decontamination systems for flameless-heater-powered thermo-chemical decontamination of facemasks or other personal protection equipment. The containment vessels can be used in a decontamination process, such as one that uses heating in combination with a low-concentration hydrogen peroxide solution, to rapidly decontaminate personal protection equipment in order to facilitate safe reuse of the equipment. Heating can be achieved using at least one flameless heater, meaning a heater that does not physically produce a flame. Also, low-concentration hydrogen peroxide solutions (such as about 3% to 6%) are routinely available in a medical setting (such as a standard hospital or a mobile Army surgical hospital (MASH) setting) or in a commercial setting (such as a pharmacy or grocery store). Thus, various equipment and chemicals used to support the decontamination process are typically already available in the setting and can be used here. Moreover, as described below, peak temperatures experienced by the personal protection equipment during the decontamination process can be limited to a suitable range, such as about 65° C. to about 80° C., which prevents damage to the equipment or degradation of the equipment's fit or function while being adequate to deactivate or kill pathogens or otherwise decontaminate the personal protection equipment. In addition, the use of the containment vessels may present little or no hazard to medical staff or other personnel.

In some embodiments, the process for decontaminating facemasks or other personal protection equipment involves placing, into a containment vessel, (i) one or more pieces of personal protection equipment and (ii) a low-concentration hydrogen peroxide solution, such as an about 3% to about 6% hydrogen peroxide solution or other hydrogen peroxide solution that is safe for everyday use. The one or more pieces of personal protection equipment may be soaked in the hydrogen peroxide solution, and/or at least one reservoir of the hydrogen peroxide solution can be positioned under the one or more pieces of personal protection equipment. The hydrogen peroxide solution helps to provide adequate vapor in the containment vessel and around the personal protection equipment during decontamination.

The containment vessel is sealed in order to keep moisture, hydrogen peroxide, and contaminants inside the containment vessel during the decontamination process. Optionally, the containment vessel can be heated and then sealed in order to replace much or all of the atmospheric air inside the containment vessel with vapor, such as water and hydrogen peroxide vapor. Once sealed (with or without the initial heating), the containment vessel is heated to a raised temperature, such as about 65° C. to about 80° C. (like about 70° C.), and maintained at the raised temperature for a period of time to decontaminate the personal protection equipment inside the containment vessel. As described below, the containment vessel is heated using a flameless heater in combination with a thermal pouch, which may be useful when electrical-powered or gas-powered heaters (such as a microwave oven) are not available. The combination of heat and heat-activated hydrogen peroxide deactivates or destroys bio-contaminants (such as bacteria and viruses) faster and at a lower temperature than either heat or hydrogen peroxide vapor alone. Once the decontamination cycle is complete, the personal protection equipment can be dried (inside or outside the containment vessel) and then used as needed.

In this way, synergy is achieved by attacking contaminants with both moist heating and hydrogen peroxide, yielding faster and more effective decontamination than either approach used alone. Also, the lower-temperature decontamination process protects facemasks or other personal protection equipment from damage or degradation, and the use of materials such as about 3% to about 6% hydrogen peroxide solution avoids toxic concentrations and potential explosiveness of higher concentrations. Moreover, the presence of metal nose strips, staples, or other metal components of the personal protection equipment will not cause damage to the equipment or their rubber straps during the decontamination process. This may be achieved using lower-temperature operations and the presence of moisture in the containment vessels, which helps to prevent the metal components from overheating and damaging the personal protection equipment.

Figure 1:
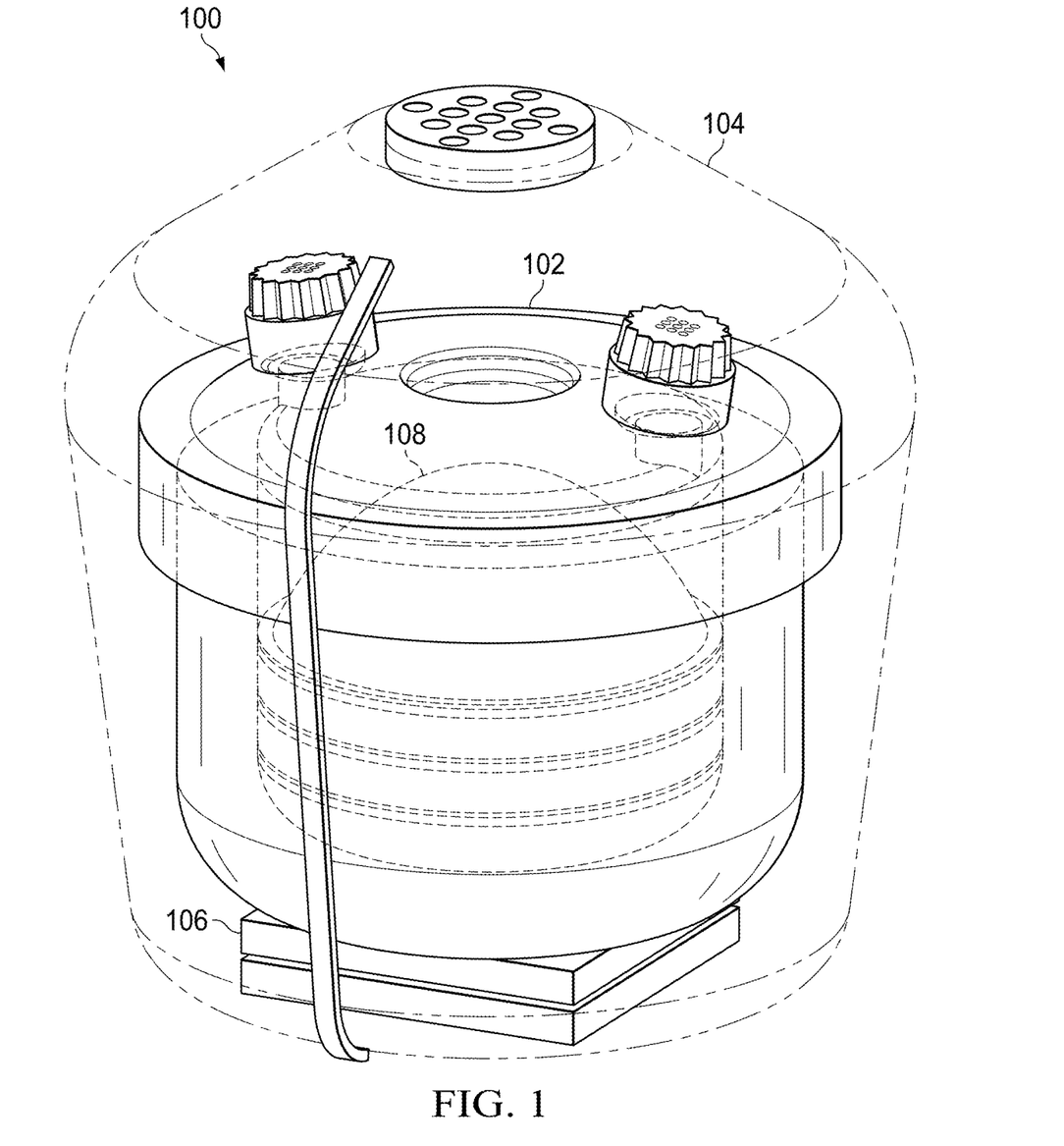
FIGS. 1 through 5 illustrate a first example low-cost, portable, flameless-heater-powered thermo-chemical decontamination system for facemasks or other personal protection equipment (PPE) in accordance with this disclosure.
Figure 2:
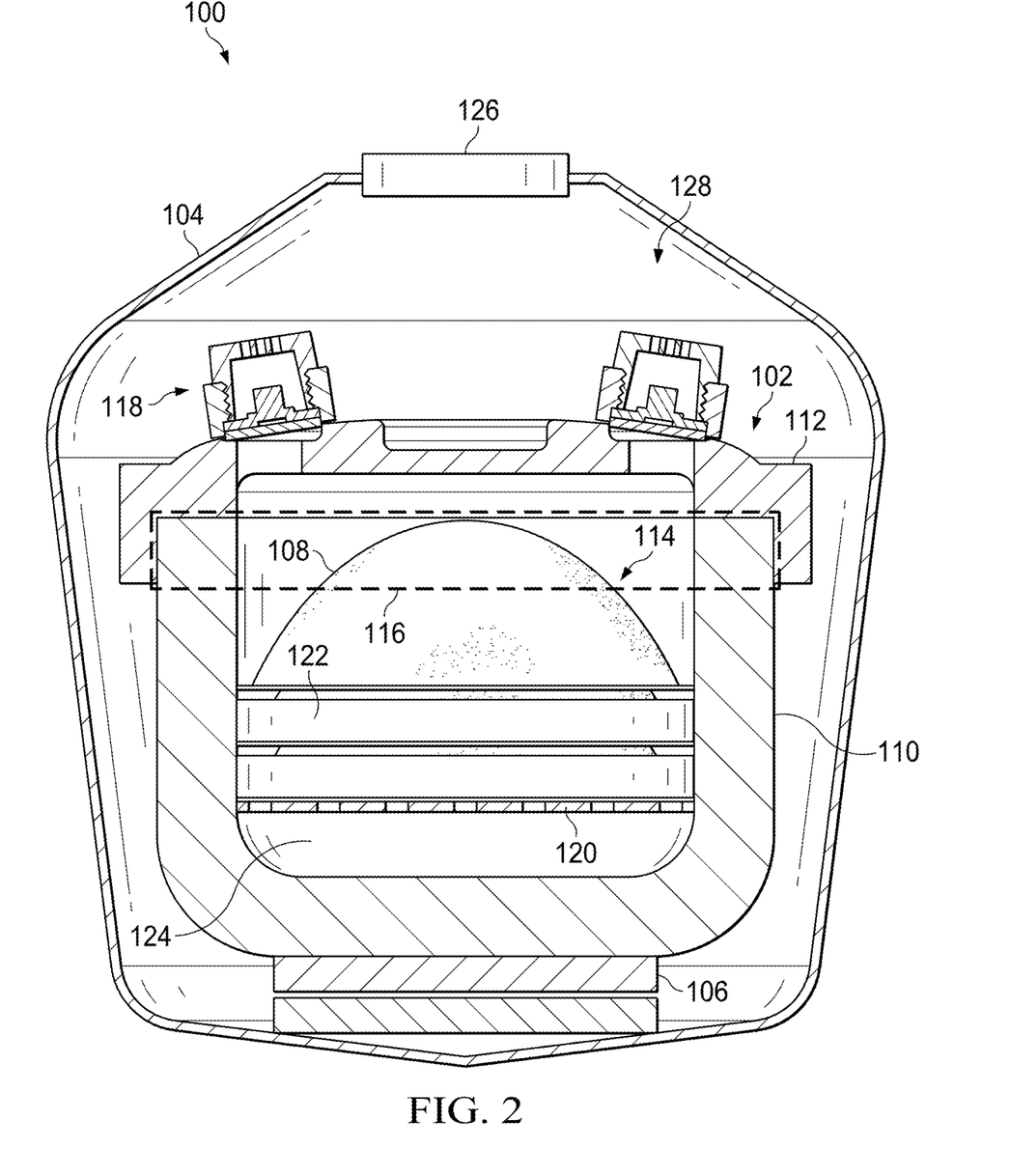
Figure 3:
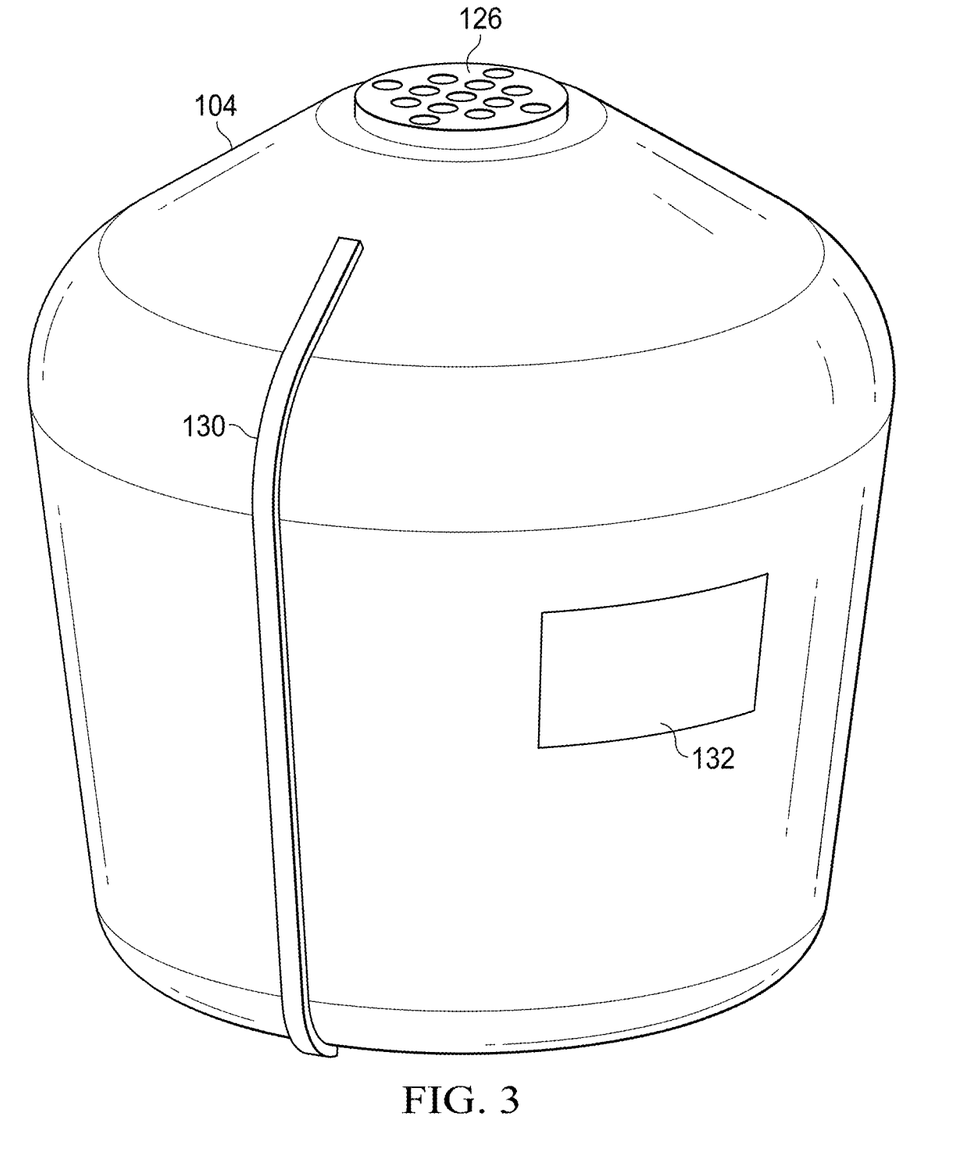
Figure 4:
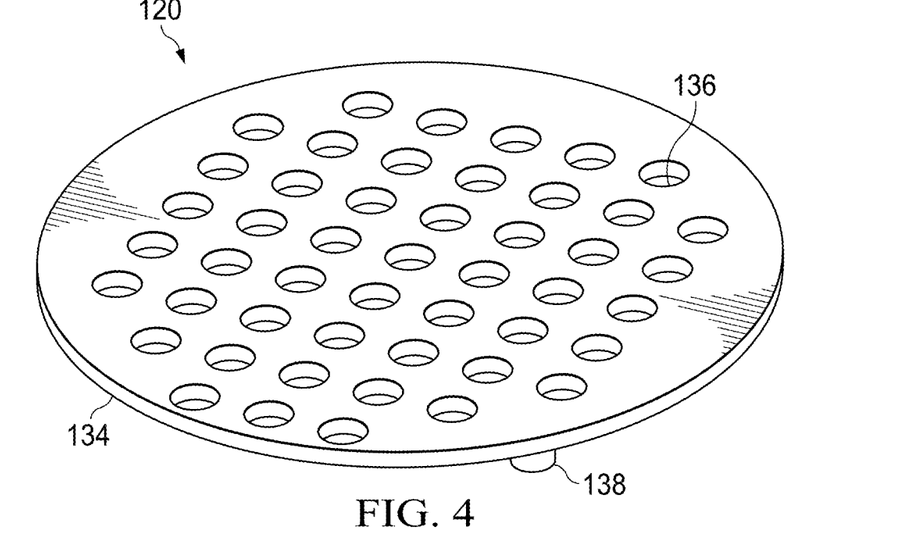
Figure 5:
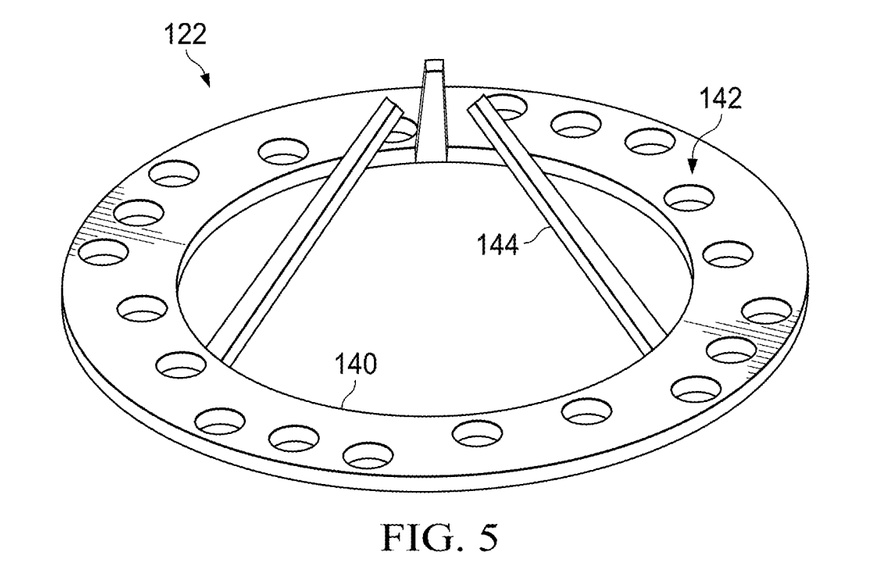

FIGS. 1 through 5 illustrate a first example decontamination system 100 for low-cost, portable, flameless-heater-powered thermo-chemical decontamination of facemasks or other personal protection equipment (PPE) in accordance with this disclosure. In particular, FIG. 1 illustrates an assembled decontamination system 100, FIG. 2 illustrates a cross-section of the decontamination system 100, and FIG. 3 illustrates a thermal pouch for the decontamination system 100. Also, FIG. 4 illustrates a base of a containment vessel, and FIG. 5 illustrates a platform of the containment vessel.

As shown in FIGS. 1 and 2, the decontamination system 100 is a portable system that provides for decontamination of personal protection equipment without a flame. The decontamination system 100 is designed to fit in a backpack or other travel-sized container. The decontamination system 100 includes a containment vessel 102, a thermal pouch 104, one or more flameless heaters 106, and one or more pieces of personal protection equipment 108. The containment vessel 102 can be inserted into the thermal pouch 104 through an opening, or the two components can be integrated. While a single containment vessel 102 is shown here as being used in conjunction with the thermal pouch 104, the thermal pouch 104 may optionally have the capacity to receive multiple containment vessels 102.

The containment vessel 102 generally takes the form of a modified, customized, or other pressure cooker or similar type of device. The containment vessel 102 includes a body 110 and a lid 112 defining an internal volume 114. The lid 112 is configured to be secured to the body 110 in order to help seal the internal volume 114. The internal volume 114 is configured to receive the one or more pieces of personal protection equipment 108. A seal 116 may be positioned between the body 110 and the lid 112 in order to help isolate or seal the internal volume 114 when the lid 112 is secured to the body 110. This helps to retain water, hydrogen peroxide, contaminants, or other materials inside the containment vessel 102 until a decontamination process is completed.

The body 110 and the lid 112 of the containment vessel 102 may be formed from any suitable material(s). In some embodiments, the body 110 and the lid 112 may be formed from ruggedized plastic or other material(s) that can be heated without deforming, such as high-density polyethylene, polymethylpentene, polypropylene, or polysulfone. Other materials may include metal, tempered glass, or ceramic. The body 110 and the lid 112 may also be formed in any suitable manner, such as additive manufacturing, injection molding, casting, machining, or other suitable technique. The containment vessel 102 overall may have any suitable size, shape, and dimensions, and each of the body 110 and the lid 112 may have any suitable size, shape, and dimensions. As a particular example, the containment vessel 102 may have an internal volume 114 of about 3.4 quarts, a height of about 7.75 inches, and a generally cylindrical shape, although other capacities, sizes, and shapes may be used. In some cases, the body 110 and the lid 112 may represent interlocking portions such that the lid 112 can be mechanically coupled to and released from the body 110, such as via rotation of the lid 112. The seal 116 includes any suitable structure configured to seal the interior space of the containment vessel 102, such as a rubber or other O-ring.

One or more integrated filters and pressure-relief valves 118 can be used with the containment vessel 102. Each pressure-relief valve includes any suitable structure configured to be selectively opened and closed to provide or block a pathway for pressure to escape from the internal volume 114 of the containment vessel 102. Each filter may be used to filter air or other fluid passing out of the containment vessel 102, such as during or after heating of the containment vessel 102. For instance, after being heated by the flameless heater 106 for a specified period of time, the pressure-relief valve(s) may be opened, and the filter(s) may filter air passing out of the containment vessel 102. Among other things, this may help to prevent exposure of contaminants around the containment vessel 102. Each filter includes any suitable structure configured to remove contaminants or other materials from fluid, such as a HEPA filter. In some embodiments, each filter is implemented by bonding or otherwise securing an adapter to the containment vessel 102, where the adapter is configured to receive a HEPA or other filter canister. As a particular example, the adapter may be threaded for attachment to the containment vessel 102, and an O-ring or other seal can be used to seal the adapter to the containment vessel 102.

Note that this example includes two integrated filters and pressure-relief valves 118, although the containment vessel 102 may include one or more than two integrated filters and pressure-relief valves 118. Also note that the one or more integrated filters and pressure-relief valves 118 may be positioned at any suitable location(s) of the containment vessel 102 and may or may not be positioned on the lid 112. Further note that the use of integrated filters and pressure-relief valves is not required and that, for instance, at least one pressure-relief valve and at least one separate filter may be used (or the filter or filters may be omitted completely).

As shown in FIG. 3, the thermal pouch 104 is sized and shaped to completely enclose the containment vessel 102. The thermal pouch 104 defines an external volume 128 around the containment vessel 102. In some cases, the thermal pouch 104 is separate from the containment vessel 102. In other cases, the thermal pouch 104 can be integrated with the containment vessel 102, such as in a pocket attached to the containment vessel 102 to store the thermal pouch 104 when not in use. In still other cases, the thermal pouch 104 can be integrated with one containment vessel 102, and one or more additional containment vessels 102 may be inserted into the thermal pouch 104.

The thermal pouch 104 can be formed from any suitable material(s), such as one or more plastics or other material(s) that can withstand elevated temperatures. The thermal pouch 104 can be flexible and foldable for convenient storage and accommodation of the containment vessel(s) 102. In order to maximize heat generated from the one or more flameless heaters 106, the thermal pouch 104 can be insulated or otherwise have a low heat transfer coefficient in order to trap the heat inside the thermal pouch 104. The thermal pouch 104 can also be formed in any suitable manner, such as by plastic film extrusion.

The thermal pouch 104 includes a pouch closure 130 for access into the thermal pouch 104. The pouch closure 130 provides a seal at an opening of the thermal pouch 104. One or more containment vessels 102, each holding one or more personal protection equipment 108 in its internal volume 114, and one or more flameless heaters 106 can be placed within the thermal pouch 104 through the pouch closure 130. The pouch closure 130 can be formed from any suitable materials. In some cases, the pouch closure 130 may include one or more different types of closures, such as a zipper, a hook and loop closure, an interlocking mechanism, or a slide-lock closure. As a particular example, a zipper can be used with an external hook and loop closure, where the hook and loop closure can be used to cover the zipper. The pouch closure 130 may have any suitable size, shape, and dimensions. For example, the pouch closure 130 may be sized to accommodate insertion of one or more containments vessels 102 and one or more flameless heaters 106.

The thermal pouch 104 may also include one or more exhaust vents 126. The exhaust vent 126 is used to release excess pressure that builds up within the external volume 128 of the thermal pouch 104. Pressure inside the thermal pouch 104 can increase due to the heat generated by the flameless heaters 106 and also from filtered gases released from the internal volume 114 of the containment vessel 102 through the integrated filters and pressure-relief valves 118. This increased pressure can cause the thermal pouch 104 to deform or cause an over-pressured condition in the external volume 128 of the containment vessel 102 without the one or more exhaust vents 126. Note that because the containment vessel 102 may utilize one or more integrated filters and pressure-relief valves 118 or otherwise include one or more filters, any toxic or otherwise contaminated vapors emitted from the containment vessel 102 can be maintained within the internal volume 114 of the containment vessel 102. Any gases that are exhausted from the internal volume 114 to the external volume 128 should not be harmful and not require an additional filter in the exhaust vent 126. Note, however, that a filter can be implemented with the exhaust vent (regardless of a filter being implemented in the containment vessel 102) if needed or desired.

Optionally, a thermal sensor or indicator 132 may be provided at one or more locations in the decontamination system 100. For example, the thermal sensor or indicator 132 may be installed on or in the thermal pouch 104 or installed on or in the containment vessel 102. When used on or in the containment vessel 102, at least part of the thermal pouch 104 may be formed using a translucent material. Each thermal sensor or indicator 132 can be designed to provide an indication whether an adequate temperature (such as a temperature for vaporizing the liquid in the containment vessel 102 or a temperature for contamination that would not damage the personal protection equipment 108) has been reached inside the thermal pouch 104 or inside the containment vessel 102. The thermal sensor or indicator 132 may also indicate an amount of time that has passed at or above a specified temperature. The thermal sensor or indicator 132 may further be designed to provide an indication when a temperature is reached that may potentially damage the personal protection equipment 108, the containment vessel 102, the thermal pouch 104, or other component(s) of the decontamination system 100. Any type or form of indicators may be used with the thermal sensor or indicator 132. For instance, the thermal sensor or indicator 132 may be color-based, such as where the thermal sensor or indicator turns yellow when the temperature is suitable for non-damaging decontamination, green when an amount of time has passed for decontaminating the personal protection equipment 108, and red when the temperature increases to a damaging level or when the temperature drops below the decontamination temperature before the personal protection equipment 108 is decontaminated. The thermal sensor or indicator 132 may have any suitable size, shape, and dimensions.

As shown in FIGS. 2 and 4, a base 120 is sized and shaped to fit within the internal volume 114 in the containment vessel 102. One or more pieces of personal protection equipment 108 can be placed on the base 120, and the base 120 holds the personal protection equipment 108 above a liquid reservoir 124 of the internal volume 114. This allows the liquid reservoir 124 (such as a low-concentration hydrogen peroxide solution or antibacterial soap) to be placed within the internal volume 114 of the containment vessel 102 and remain underneath the base 120. When the liquid in the liquid reservoir 124 is heated, vaporized liquid can travel upward and surround the personal protection equipment 108 to facilitate decontamination of the personal protection equipment 108. In this example, the base 120 includes a base plate 134, multiple holes 136, and multiple standoffs 138. The holes 136 allow vaporized liquid (such as water and hydrogen peroxide vapor) to travel from under the base plate 134 to surround the personal protection equipment 108 during the decontamination process. The standoffs 138 elevate or help to hold the base plate 134 above the bottom surface of the internal volume 114 to provide space for the liquid reservoir 124.

The base plate 134 may be formed from any suitable material(s), such as metal or ruggedized plastic. The base plate 134 may also be formed in any suitable manner, such as additive manufacturing, injection molding, casting, machining, or other suitable technique. The base plate 134 may have any suitable size, shape, and dimensions. In this example, the base plate 134 is generally circular, although other shapes may be used. Each of the holes 136 may have any suitable size, shape, and dimensions, and any suitable number and arrangement of the holes 136 may be used in the base plate 134. The holes 136 may also be formed in the base plate 134 in any suitable manner, such as by etching or otherwise forming the holes 136 in an already-formed base plate 134 or by forming the base plate 134 to include the holes 136. The standoffs 138 can be formed from any suitable material(s) and in any suitable manner. The standoffs 138 may be formed integral with the base plate 134 or formed separate from and attached to the base plate 134.

As shown in FIGS. 2 and 5, multiple platforms 122 are sized and shaped to fit within the internal volume 114 in the containment vessel 102. Note that this example includes three platforms 122, although the containment vessel 102 may include one, two, or more than three platforms 122. Also note that the inner wall(s) of the internal volume 114 may be slanted or otherwise designed so that the internal volume 114 has a non-uniform width, in which case the multiple platforms 122 may have different sizes. One or more pieces of personal protection equipment 108 can be placed on each platform 122, and each platform 122 holds the personal protection equipment 108 above the base 120 or above one or more lower platforms 122. This allows the liquid reservoir 124 to remain underneath the platforms 122. When the liquid reservoir 124 is heated, vaporized liquid can travel upward and surround the personal protection equipment 108 to facilitate decontamination of the personal protection equipment 108. In this example, each platform 122 includes a center opening 140 and multiple holes 142, which allow vaporized liquid (such as water and hydrogen peroxide vapor) to travel from under the platforms 122 to surround the personal protection equipment 108 during the decontamination process.

Separation of the platforms 122 from the bottom surface of the internal volume 114 and from one another when inserted into the containment vessel 102 may be achieved in any suitable manner. For example, in some embodiments, the base 120 may be separated from the bottom surface of the internal volume 114 using the standoffs 138, and each platform 122 may be separated from the base 120 or a lower platform 122 using taller standoffs. In other embodiments, at least some of the platforms 122 may rest on brackets that project inward from the inner wall(s) of the internal volume 114, and each of the base 120 and lower platforms 122 may be sized or shaped to move past brackets for higher platforms 122 or may include slots that allow that base 120 and lower platforms 122 to pass around the brackets for higher platforms 122. However, any other suitable mechanism may be used here to support or separate the platforms 122.

The center opening 140 of each platform 122 helps to increase the space within the internal volume 114 that can be occupied by the personal protection equipment 108. The center opening 140 can also be designed around separating specific personal protection equipment 108. For example, a mask can be shaped in a hemisphere, and the center opening 140 of one platform 122 can accommodate a top portion of the mask held on the base 120 or a lower platform 122. This allows the platforms 122 to be separated less than the height of the mask. The clearance of the personal protection equipment 108 is helpful in ensuring proper decontamination, and the internal volume 114 can accommodate more masks when the platforms 122 help to ensure proper separation of the masks. The center opening 140 can have any suitable size, shape, and dimensions. For example, the center opening 140 can be shaped based on contours of the personal protection equipment 108 for decontamination in the containment vessel 102.

Each platform 122 may include one or more racks 144 for maintaining separation of personal protection equipment 108 that does not have a sturdy form. For instance, after multiple uses, a piece of personal protection equipment 108 may lose sturdiness based on normal wear and tear. The personal protection equipment 108 may also lose sturdiness by absorbing vaporized liquid during the decontamination process. The one or more racks 144 can prop up the personal protection equipment 108 and prevent it from sagging and contacting a lower piece of personal protection equipment 108. The racks 144 can extend any suitable distance or height from an edge of the platform 122.

Each platform 122 may be formed from any suitable material(s), such as metal or ruggedized plastic. Each platform 122 may also be formed in any suitable manner, such as additive manufacturing, injection molding, casting, machining, or other suitable technique. Each platform 122 may have any suitable size, shape, and dimensions. In this example, each platform 122 is generally circular, although other shapes may be used. The center opening 140 may have any suitable size, shape, and dimensions for separating personal protection equipment 108. Each of the holes 142 may have any suitable size, shape, and dimensions, and any suitable number and arrangement of the holes 142 may be used in each platform 122. The center opening 140 and holes 142 may also be formed in each platform 122 in any suitable manner, such as by etching or otherwise forming the center opening 140 and the holes 142 in an already-formed platform 122 or by forming each platform 122 to include the center opening 140 and the holes 142. The racks 144 can be formed from any suitable material(s) and in any suitable manner. The racks 144 can be formed from the same or different material(s) as the platform 122. The racks 144 may be formed integral with the platform 122 or formed separate from and attached to the platform 122. The racks 144 may also be implemented with the base 120 in a similar manner as described with the platforms 122.

The one or more flameless heaters 106 can be placed in the thermal pouch 104 with the containment vessel 102. The flameless heaters 106 produce heat without a flame, which might damage the thermal pouch 104. Examples of flameless heaters 106 can include a meal-ready-to-eat (MRE) heater, a flameless ratio heater (FRH), or a water-activated exothermic reaction heater. MREs are commonly found as supplies for areas that have been affected by a natural disaster and as supplies for use in military operations. Some flameless heaters 106 function based on an exothermic reaction activated by water, which will typically be available in some form in most environments. These types of flameless heaters 106 initially contain a metal (such as finely-powdered magnesium metal) that creates an exothermic reaction when exposed to water. In order to accelerate the exothermic reaction, one or more metals (such as metallic iron particles and table salt) can form a galvanic cell that has a super-corroding effect. However generated, the heat from the flameless heaters 106 can vaporize a liquid in the liquid reservoir 124 of the containment vessel 102.

The one or more flameless heaters 106 can be easily stored along with or inside the containment vessel 102 outside of a decontamination process and placed in the external volume 128 of the thermal pouch 104 during the decontamination process. In some cases, a flameless heaters 106 can transfer heat directly from a surface of the flameless heater 106 to a surface of the containment vessel 102 and/or indirectly from heating the air in the external volume 128 of the thermal pouch 104. The containment vessel 102 can include brackets or another connection mechanism for coupling to or arranging of the flameless heater(s) 106 to increase direct heating of the containment vessel 102. Each flameless heater 106 may have any suitable size, shape, and dimensions. Flameless heaters 106 of different sizes, brands, and types can be used to generate a suitable amount of heat for decontamination.

In this example, the pieces of personal protection equipment 108 include multiple facemasks, such as N95/KN95/N99/N100/P100 surgical masks. In this particular example, three facemasks have been stacked in order to more completely fill the internal volume 114 of the containment vessel 102. The presence of the liquid reservoir 124 (such as a reservoir of low-concentration hydrogen peroxide solution) under the base 120 and/or the soaking of the personal protection equipment 108 in such a liquid allows vapor to form and surround the facemasks. The heating of the internal volume 114 of the containment vessel 102, along with the presence of the vaporized liquid around the personal protection equipment 108, helps to facilitate faster and more effective decontamination of the personal protection equipment 108.

In some embodiments, a decontamination process involving the decontamination system 100 may occur as follows. A suitable amount of personal protection equipment 108 can be placed on the base 120 and one or more platforms 122, such as an amount of personal protection equipment 108 that partially or substantially fills the internal volume 114 of the containment vessel 102. The personal protection equipment 108 may be soaked in liquid, such as a low-concentration hydrogen peroxide solution, prior to be placed in the containment vessel 102. A suitable amount of liquid, such as low-concentration (like 3% to 6%) hydrogen peroxide solution, can also optionally be placed in the internal volume 114 of the containment vessel 102 as the liquid reservoir 124. For instance, the amount of liquid may be adequate to cover the bottom surface of the internal volume 114 of the containment vessel 102.

The lid 112 can then be secured to the body 110 of the containment vessel 102. In some cases, the integrated filters and pressure-relief valves 118 may initially be opened, and the containment vessel 102 can be heated to allow air in the containment vessel 102 to be substantially replaced with vapor, after which the integrated filters and pressure-relief valves 118 may be closed and heating of the containment vessel 102 can continue. In other cases, the integrated filters and pressure-relief valves 118 may initially be closed, and the containment vessel 102 can be heated with the integrated filters and pressure-relief valves 118 in the closed position. In either case, once the containment vessel 102 is sealed using the integrated filters and pressure-relief valves 118, the heating may continue for a specified time period, and the heating can heat the personal protection equipment 108 to a temperature within a relatively-low temperature range, such as about 65° C. to about 80° C., to prevent damage to the personal protection equipment 108 while decontaminating the personal protection equipment 108.

In order to heat the containment vessel 102 here, the containment vessel 102 is inserted through an opening into the thermal pouch 104 before or after the personal protection equipment 108 is inserted into the internal volume 114 of the containment vessel 102. One or more flameless heaters 106 can also be inserted through the opening before or after inserting the containment vessel 102. For example, one or more flameless heaters 106 can be inserted in the thermal pouch 104 before or after the containment vessel 102 is inserted into the thermal pouch 104 so that flameless heaters 106 are located on opposite sides of the containment vessel 102. The flameless heaters 106 can be activated, either before or after insertion into the thermal pouch 104 but before the thermal pouch 104 is sealed using the pouch closure 130. The flameless heaters 106 produce heat, such as from an exothermic reaction, that may directly heat the containment vessel 102 and/or indirectly heat the air in the external volume 128 of the thermal pouch 104.

The thermal sensor or indicator 132 can indicate that a temperature of the air inside the external volume 128 of the thermal pouch 104 has reached a non-damaging decontamination temperature for the liquid, such as a suitable range of about 65° C. to about 80° C. for a low-concentration hydrogen peroxide solution. After a period of decontamination time, the thermal sensor or indicator 132 may change to indicate that the personal protection equipment 108 has been decontaminated. The thermal sensor or indicator 132 can further indicate when the temperature is high enough to damage the personal protection equipment 108 or low enough to not fully decontaminate the personal protection equipment 108. When the thermal sensor or indicator 132 indicates that the personal protection equipment decontamination was not successful, the process can be repeated, such as with one or more new flameless heaters 106.

Once this part of the process is completed, the personal protection equipment 108 can be dried, which may occur in any suitable manner. For instance, in some cases, the personal protection equipment 108 may be removed from the containment vessel 102 and allowed to air dry (such as on a rack), or the personal protection equipment 108 may be removed from the containment vessel 102 and mechanically dried using a hair dryer or other heat or air source (assuming an adequately-reliable or accessible power source is available). In other cases, the integrated filters and pressure-relief valves 118 can be opened, and the containment vessel 102 can again be heated (possibly in the same or similar manner as the first heating) so that moisture within the containment vessel 102 can escape and allow drying of the personal protection equipment 108. Any other suitable approach for drying the personal protection equipment 108 may also be used here.

Note that while the base 120 is described above as being placed over a liquid reservoir 124 in the containment vessel 102, the base 120 may be integrated with or otherwise be used in conjunction with a pan under the base 120, where the pan holds liquid like a low-concentration hydrogen peroxide solution. Also note that any suitable containment vessel 102 may be used here. Specific examples of containment vessels 102 that may be used in FIGS. 1 through 5 are disclosed in U.S. patent application Ser. No. 16/986,761 filed on Aug. 6, 2020 and U.S. patent application Ser. No. 17/124,208 filed on Dec. 16, 2020 (both of which are hereby incorporated by reference in their entirety). However, other embodiments of the containment vessel 102 may be used.

Although FIGS. 1 through 5 illustrate a first example of a decontamination system 100 for low-cost, portable, flameless-heater-powered thermo-chemical decontamination of facemasks or other personal protection equipment, various changes may be made to FIGS. 1 through 5. For example, the sizes, shapes, and dimensions of the decontamination system 100 and its individual components can vary as needed or desired. Also, the number and placement of various components of the decontamination system 100 can vary as needed or desired. In addition, the decontamination system 100 may be used in any other suitable decontamination process and is not limited to the specific processes described above.

Figure 6:
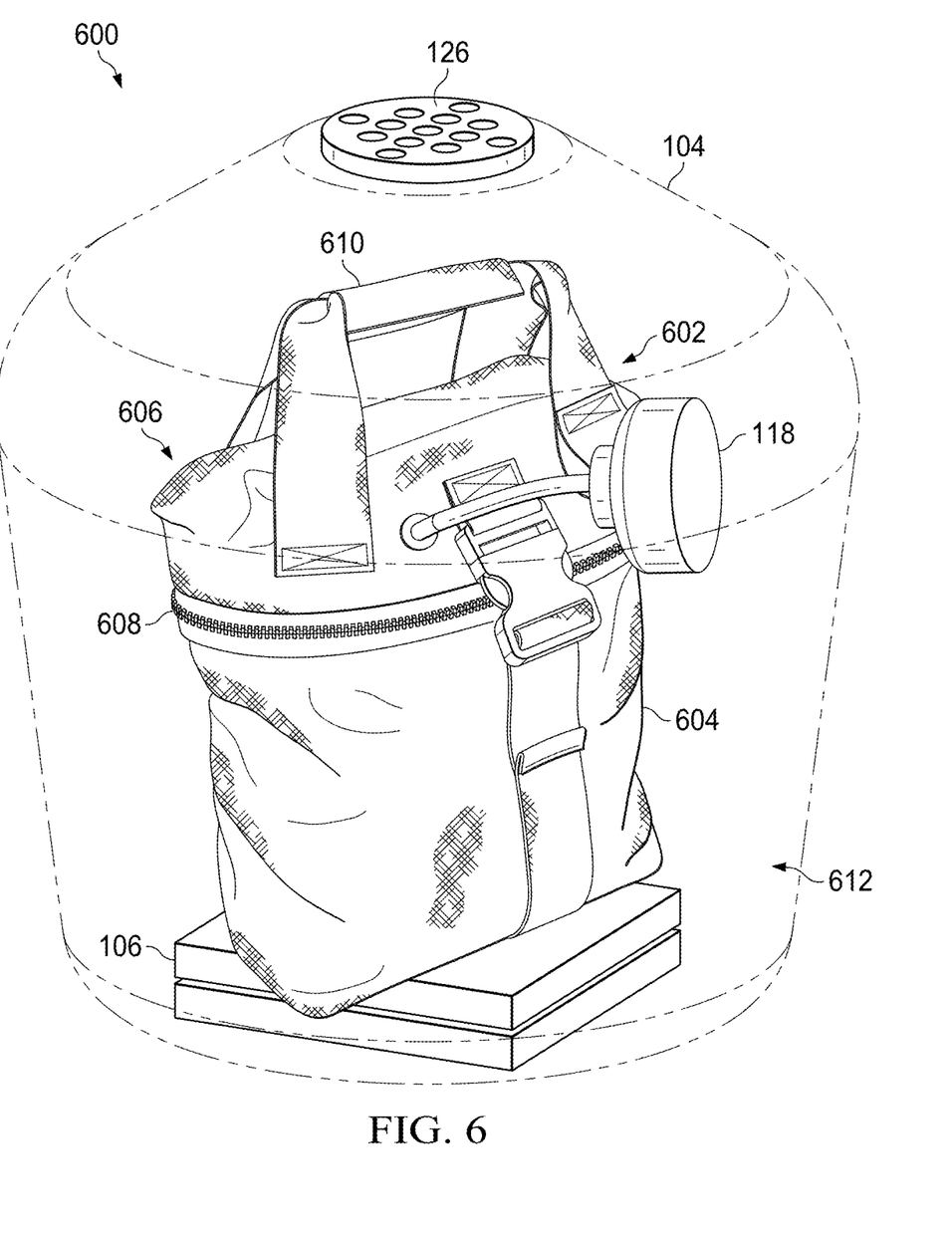
FIG. 6 illustrates a second example low-cost, portable, flameless-heater-powered thermo-chemical decontamination system for facemasks or other personal protection equipment in accordance with this disclosure.

FIG. 6 illustrates a second example low-cost, portable, flameless-heater-powered thermo-chemical decontamination system 600 for facemasks or other personal protection equipment in accordance with this disclosure. As shown in FIG. 6, a containment vessel 602 generally takes the form of a smaller structure (relative to the containment vessel 102) that may be used with the thermal pouch 104 and the flameless heater(s) 106. Although not illustrated here, the internal components of the containment vessel 602 can be configured similarly to the internal components of the containment vessel 102.

In this example, the containment vessel 602 includes a body 604 and a lid 606 configured to be secured to the body 604. The lid 606 can be secured to the body 604 using a vessel closure 608, such as a zipper, a hook and loop closure, an interlocking mechanism, or a slide-lock closures, that attaches the body 604 and the lid 606. The body 604 and the lid 606 collectively define an interior space or volume into which the personal protection equipment 108 can be placed. An additional seal may be positioned between the body 604 and the lid 606 in order to help isolate or seal the internal volume when the lid 606 is secured to the body 604. The body 604 and/or the lid 606 may optionally include handles 610 to facilitate easier lifting or transport of the containment vessel 602.

The body 604 and the lid 606 of the containment vessel 602 may be formed from any suitable material(s). In some embodiments, the body 604 and the lid 606 may be formed from fabric or other material(s) that can heated without deforming. The body 604 and the lid 606 may also be formed in any suitable manner, such as sewing or any other suitable technique. The containment vessel 602 overall may have any suitable size, shape, and dimensions, and each of the body 604 and the lid 606 may have any suitable size, shape, and dimensions. The seal includes any suitable structure configured to seal the interior space of the containment vessel 602, such as a rubber or other O-ring. Each handle 610 may be formed integral with the body 604 or lid 606 or formed separate from and attached to the 604 or lid 606.

One or more integrated filters and pressure-relief valves 118 can be used with the containment vessel 602 and perform the same functions described above. Note that this example includes a single integrated filter and pressure-relief valve 118, although the containment vessel 602 may include more than one integrated filter and pressure-relief valve 118. Also note that the one or more integrated filters and pressure-relief valves 118 may be positioned at any suitable location(s) of the containment vessel 602 and may or may not be positioned on one or more sides of the body 604 or lid 606. Further note that the use of integrated filters and pressure-relief valves is not required and that, for instance, at least one pressure-relief valve and at least one separate filter may be used (or the filter or filters may be omitted completely).

The thermal pouch 104 is sized and shaped here to completely enclose the containment vessel 602. Again, depending on the implementation, the thermal pouch 104 may be configured to receive one or multiple containment vessels 602, along with the one or more flameless heaters 106. The thermal pouch 104 can include one or more exhaust vents 126 that perform the same functions described above. The thermal pouch 104 and the one or more flameless heaters 106 can be used in the same decontamination processes described above in order to decontaminate the personal protection equipment 108 in the containment vessel 602.

Although FIG. 6 illustrates a second example of a low-cost, portable, flameless-heater-powered thermo-chemical decontamination system 600 for facemasks or other personal protection equipment, various changes may be made to FIG. 6. For example, the sizes, shapes, and dimensions of the decontamination system 600 and its individual components can vary as needed or desired. Also, the number and placement of various components of the decontamination system 600 can vary as needed or desired. In addition, the decontamination system 600 may be used in any other suitable decontamination process and is not limited to the specific processes described above.

Various approaches may be used to determine a number and/or heating output of the flameless heater(s) 106 to ensure that personal protection equipment is heated to an appropriate temperature range and maintained there for a period needed to complete a decontamination process without overheating. In some cases, for example, test strips containing bacillus atrophaeus spores or other contaminants can be placed on masks or other equipment that is placed inside a containment vessel, and heating of the masks or other equipment may occur using one or more specific types of flameless heater(s) 106. This can be repeated for various numbers and types of flameless heater(s) 106. The test strips can then be evaluated to identify which settings are adequate for decontamination, and the masks or other equipment can be inspected for damage. One or more suitable configurations of flameless heater(s) 106 for decontaminating the masks or other equipment while avoiding damage to the equipment can then be identified.

Figure 7:
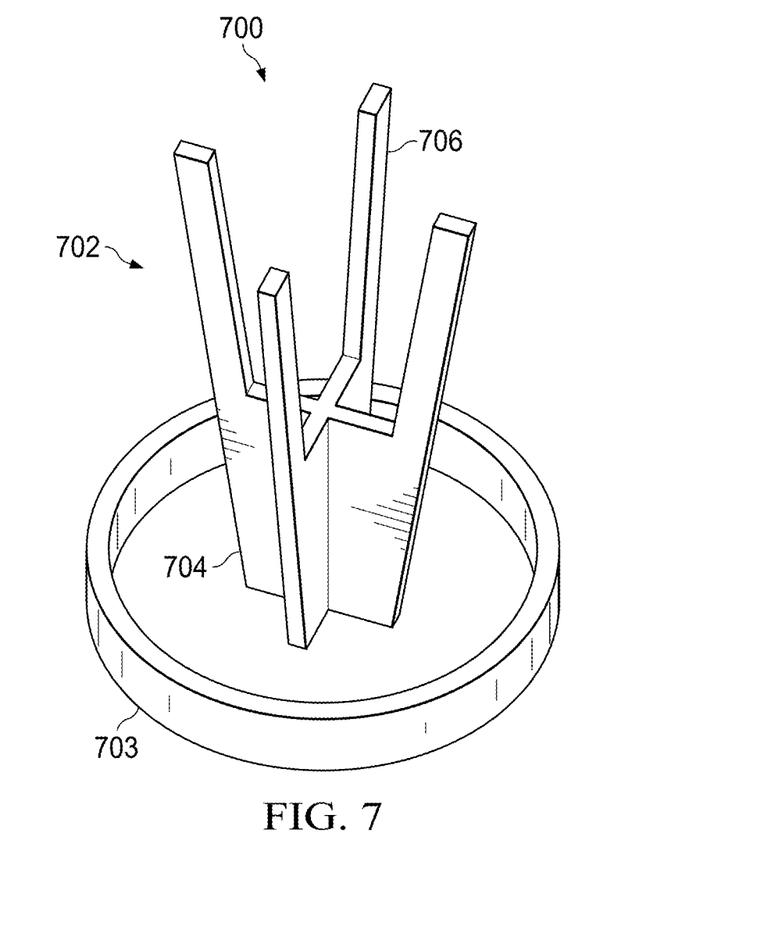
FIG. 7 illustrates an example alternative structure for holding facemasks or other personal protection equipment in a containment vessel of a decontamination system during decontamination in accordance with this disclosure.

The containment vessels 102 and 602 described above have been illustrated as using a substantially flat or planar base 120 and substantially flat and annular platforms 122 to hold masks or other personal protection equipment. However, non-planar bases or other structures may also be used in any of these containment vessels. The specific design of a non-planar base can vary as needed or desired. FIG. 7 illustrates an example alternative structure 700 for holding facemasks or other personal protection equipment in a containment vessel of a decontamination system during decontamination in accordance with this disclosure. As shown in FIG. 7, the structure 700 includes a stand 702 that extends upward from a liquid reservoir 703, which is formed as a wall surrounding the stand 702. The stand 702 is configured to receive and hold a mask or other personal protection equipment 108 above liquid. In some embodiments, the stand 702 may be centered or off-center in order to maintain adequate and more uniform spacing between the personal protection equipment 108.

The stand 702 includes a base portion 704 and multiple arms 706 extending upward from the base portion 704. The base portion 704 is configured to support the arms 706, and the arms 706 are configured to receive at least one piece of personal protection equipment to be decontaminated. In this particular example, the base portion 704 has a cross-section in the form of a "+" sign, and each arm 706 has a cross-section in the form of a rectangle. However, the base portion 704 and arms 706 may each have any other suitable cross-sectional shape. Also, while four arms 706 extend upward from the base portion 704 in this example, the stand 702 may include any other suitable number of arms 706.

Note that while not shown here, the stand 702 may be attached to the liquid reservoir 703 to support the stand 702 and prevent the stand 702 from falling over. In these embodiments, the stand 702 may be attached to the liquid reservoir 703 at one or more locations. Also note that while not shown here, the stand 702 can be secured or otherwise attached to a base 120 (such as a circular or rectangular base as described above). The stand 702 and the liquid reservoir 703 may each be formed from any suitable material(s), such as metal or ruggedized plastic. The stand 702 and the liquid reservoir 703 may each also be formed in any suitable manner, such as additive manufacturing, injection molding, casting, machining, or other suitable technique. The stand 702 and the liquid reservoir 703 may each have any suitable size, shape, and dimensions.

The stand 702 shown here may be used in any of the containment vessels 102 or 602 described above or in other containment vessels designed in accordance with this disclosure. Depending on the size of the stand 702 and the size of the containment vessel used, multiple instances of the stand 702 and liquid reservoir 703 may be implemented. In some cases, the stand 702 can be implemented alternatively with the racks 144.

Although FIG. 7 illustrates one example of an alternative structure 700 for holding facemasks or other personal protection equipment in a containment vessel of a decontamination system during decontamination, various changes may be made to FIG. 7. For example, the sizes, shapes, and dimensions of the components of the structure 700 can vary as needed or desired. Also, the number and placement of various components of the structure 700 can vary as needed or desired. In addition, the structure 700 may be used in any other suitable decontamination process and is not limited to the specific processes described above.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. An apparatus comprising:
   a containment vessel comprising an internal volume configured to be sealed, a base disposed within the internal volume, a liquid reservoir disposed within the internal volume and below the base, and one or more platforms disposed within the internal volume and above the base and configured to hold one or more pieces of personal protection equipment, wherein each of the one or more platforms comprises one or more racks extending from an edge of the respective platform, and wherein the internal volume is configured to receive (i) liquid to be vaporized during a decontamination process and (ii) the one or more pieces of personal protection equipment to be heated and decontaminated during the decontamination process;
   one or more flameless heaters configured to generate heat without a flame when activated;

a thermal pouch configured to enclose the containment vessel and the one or more flameless heaters such that the heat from the one or more flameless heaters heats the containment vessel during the decontamination process, wherein the thermal pouch comprises a pouch closure configured to close and seal an opening of the thermal pouch, and wherein the pouch closure comprises:
- a zipper configured to close the opening of the thermal pouch; and
- a hook and loop fastener configured to connect across and over the zipper;

a thermal sensor or indicator disposed on the thermal pouch and configured to provide an indication of whether a temperature of gas in the thermal pouch has reached a temperature threshold for non-damaging decontamination in the containment vessel and a second indication of whether a temperature of the gas in the thermal pouch has reached a temperature that may potentially damage the personal protection equipment; and a second thermal sensor or indicator disposed on the containment vessel and configured to provide an indication of whether the temperature of the gas in the thermal pouch has reached the temperature threshold for non-damaging decontamination in the containment vessel.

2. The apparatus of claim 1, wherein the thermal pouch is connected to a portion of the containment vessel.

3. The apparatus of claim 1, wherein the thermal pouch is flexible, foldable, and insulated and is configured to maintain at least a substantial portion of the heat generated by the one or more flameless heaters within the thermal pouch.

4. The apparatus of claim 1, wherein the thermal pouch comprises a vent configured to maintain a pressure in the thermal pouch below a pressure threshold.

5. The apparatus of claim 4, wherein the vent does not include a filter.

6. The apparatus of claim 1, wherein the thermal sensor or indicator is also configured to indicate an amount of time that the temperature is at or above the temperature threshold.

7. The apparatus of claim 1, wherein the thermal pouch comprises a translucent material configured to allow viewing of the second thermal sensor or indicator without opening the thermal pouch.

8. The apparatus of claim 1, wherein the containment vessel comprises a flexible bag.

9. The apparatus of claim 1, wherein each of the one or more platforms includes a center opening configured to separate the one or more pieces of personal protection equipment.

10. The apparatus of claim 1, wherein the one or more racks are configured to maintain separation of the one or more pieces of personal protection equipment.

11. A method comprising:
placing liquid to be vaporized during a decontamination process in an internal volume of a containment vessel comprising:
- a base disposed within the internal volume;
- a liquid reservoir disposed within the internal volume and below the base; and
- one or more platforms disposed within the internal volume and above the base and configured to hold one or more pieces of personal protection equipment, wherein each of the one or more platforms comprises one or more racks extending from an edge of the respective platform;

placing the one or more pieces of personal protection equipment within the internal volume of the containment vessel;

sealing the internal volume of the containment vessel;

activating one or more flameless heaters to generate heat without a flame;

enclosing, in a thermal pouch, the containment vessel and the one or more flameless heaters;

closing and sealing an opening of the thermal pouch using a pouch closure, wherein closing and sealing the opening of the thermal pouch using the pouch closure comprises:
- closing the opening of the thermal pouch using a zipper; and
- connecting a hook and loop faster across and over the zipper;

decontaminating the one or more pieces of personal protection equipment by heating the one or more pieces of personal protection equipment in the sealed internal volume of the containment vessel using the heat generated by one or more flameless heaters;

providing, using a thermal sensor or indicator disposed on the thermal pouch, an indication of whether a temperature of gas in the thermal pouch has reached a temperature threshold for non-damaging decontamination in the containment vessel and a second indication of whether a temperature of the gas in the thermal pouch has reached a temperature that may potentially damage the personal protection equipment; and providing, using a second thermal sensor or indicator disposed on the containment vessel, an indication of whether the temperature of the gas in the thermal pouch has reached the temperature threshold for non-damaging decontamination in the containment vessel.

12. The method of claim 11, wherein the thermal pouch is connected to a portion of the containment vessel.

13. The method of claim 11, wherein the thermal pouch is flexible, foldable, and insulated and is configured to maintain at least a substantial portion of the heat generated by the one or more flameless heaters within the thermal pouch.

14. The method of claim 11, further comprising:
maintaining a pressure in the thermal pouch below a pressure threshold using a vent on the thermal pouch.

15. The method of claim 14, wherein the vent does not include a filter.

16. The method of claim 11, wherein the thermal sensor or indicator on the thermal pouch also indicates an amount of time that the temperature is at or above the temperature threshold.

17. The method of claim 11, wherein the thermal pouch comprises a translucent material configured to allow viewing of the second thermal sensor or indicator without opening the thermal pouch.

18. The method of claim 11, wherein the containment vessel comprises a flexible bag.

19. The method of claim 11, wherein each of the one or more platforms includes a center opening configured to separate the one or more pieces of personal protection equipment.

20. The method of claim 11, wherein the one or more racks are configured to maintain separation of the one or more pieces of personal protection equipment.

* * * * *